United States Patent
Suetsugu et al.

(10) Patent No.: US 8,423,229 B2
(45) Date of Patent: Apr. 16, 2013

(54) DEVICE AND METHOD FOR PERFORMING SELF-DIAGNOSIS AS TO WHETHER OR NOT ACCELERATION OR ANGULAR-VELOCITY SENSOR IS IN NORMAL STATUS

(75) Inventors: Eiji Suetsugu, Chiyoda-ku (JP); Wataru Hayashi, Itami (JP)

(73) Assignee: Mitsubishi Electric Corporation, Tokyo (JP)

( * ) Notice: Subject to any disclaimer, the term of this patent is extended or adjusted under 35 U.S.C. 154(b) by 966 days.

(21) Appl. No.: 12/490,695

(22) Filed: Jun. 24, 2009

(65) Prior Publication Data

US 2010/0179722 A1 Jul. 15, 2010

(30) Foreign Application Priority Data

Jan. 9, 2009 (JP) ................. 2009-003883

(51) Int. Cl.
*G06F 7/00* (2006.01)
*G06F 11/30* (2006.01)
*G07C 5/00* (2006.01)

(52) U.S. Cl.
USPC ........................ 701/29.2; 701/29.7; 701/34

(58) Field of Classification Search ............... 701/30.9, 701/31.1, 29.8, 29.2, 29.7, 34; 73/488; 364/566; 702/104, 116, 141, 183
See application file for complete search history.

(56) References Cited

U.S. PATENT DOCUMENTS

| | | | | |
|---|---|---|---|---|
| 4,979,117 A | * | 12/1990 | Hattori et al. | ................. 701/110 |
| 5,541,645 A | * | 7/1996 | Davis | .............................. 348/96 |
| 2003/0000308 A1 | | 1/2003 | Banno et al. | |
| 2006/0272386 A1 | | 12/2006 | Mayer-Wegellin et al. | |
| 2010/0057289 A1 | * | 3/2010 | Hiraoka | ......................... 701/31 |

FOREIGN PATENT DOCUMENTS

| | | |
|---|---|---|
| DE | 102 25 212 A1 | 12/2002 |
| DE | 10 2006 046 031 B3 | 5/2008 |
| DE | 102006046031 B3 * | 5/2008 |
| JP | 61-250355 | 11/1986 |
| JP | 3-4096 | 1/1991 |
| JP | 7-146308 | 6/1995 |
| JP | 8-35984 | 2/1996 |
| JP | 9-175321 | 7/1997 |

(Continued)

OTHER PUBLICATIONS

Korean Office Action issued Jul. 11, 2011, in Patent Application No. 10-2009-0075568 (with English translation).

(Continued)

*Primary Examiner* — Khoi Tran
*Assistant Examiner* — Robert Nguyen
(74) *Attorney, Agent, or Firm* — Oblon, Spivak, McClelland, Maier & Neustadt, L.L.P.

(57) ABSTRACT

A self-diagnostic device for an acceleration or angular-velocity sensor includes a diagnosis control unit, an integration unit, and a determination unit. The diagnosis control unit provides pseudo acceleration or angular velocity to a sensor main body for detecting acceleration or angular velocity, by applying a test signal having prescribed magnitude to the sensor main body. The integration unit integrates a sensor signal outputted from the sensor main body in response to the test signal. The determination unit determines whether or not an integration value obtained at an elapse of prescribed integration time from a time point when the integration unit starts integrating the sensor signal falls within a prescribed normal range.

7 Claims, 9 Drawing Sheets

FOREIGN PATENT DOCUMENTS

| | | |
|---|---|---|
| JP | 9-218040 | 8/1997 |
| JP | 09218040 A * | 8/1997 |
| JP | 2000-4366 | 1/2000 |
| JP | 2001-304871 | 10/2001 |
| JP | 2003-262648 | 9/2003 |
| JP | 2004-233187 | 8/2004 |
| JP | 2006-56441 | 3/2006 |
| JP | 2007-245829 | 9/2007 |
| WO | WO 2008/037601 A1 | 4/2008 |
| WO | WO 2008/139743 A1 | 11/2008 |
| WO | WO 2008139743 A1 * | 11/2008 |

OTHER PUBLICATIONS

Office Action issued Mar. 22, 2011, in German Patent Application No. 10 2009 036 099.9 (with English-language translation).

Chinese Office Action issued Aug. 26, 2011 in patent application No. 200910179501.X with English Translation.

Office Action (Notice of Allowance) issued Mar. 27, 2012, in Korean Patent Application No. 10-2009-0075568 (with English-language translation).

Japanese Office Action issued Aug. 28, 2012, in Patent Application No. 2009-003883 (with English-language translation).

* cited by examiner

DEVICE AND METHOD FOR PERFORMING SELF-DIAGNOSIS AS TO WHETHER OR NOT ACCELERATION OR ANGULAR-VELOCITY SENSOR IS IN NORMAL STATUS

BACKGROUND OF THE INVENTION

1. Field of the Invention

The present invention relates to a self-diagnostic device and a self-diagnostic method for performing a diagnosis as to whether or not an acceleration or angular-velocity sensor is in a normal status. The present invention further relates to an acceleration or angular-velocity sensor provided with such a self-diagnostic device, and a method of initially setting the acceleration or angular-velocity sensor.

2. Description of the Background Art

An acceleration and angular-velocity sensor is widely used in controlling of an air bag device of a vehicle such as a motor vehicle. For example, an air bag control device disclosed in Japanese Patent Laying-Open No. 2006-056441 includes a main acceleration sensor, and a safety acceleration sensor disposed at a position different from that of the main acceleration sensor, so as to prevent malfunction and ensure reliable activation.

In the air bag control device described in this document, the main acceleration sensor detects acceleration and outputs an acceleration signal, and a microcontroller integrates the acceleration signal received from the main acceleration sensor. When an integration value of the acceleration exceeds a prescribed value because the acceleration is increased in a deceleration direction owing to a collision of the vehicle, the microcontroller determines that the vehicle has collided, and outputs a trigger signal at a high level to an AND circuit.

Further, an acceleration detection output of the safety acceleration sensor is A/D (Analog to Digital)-converted by an A/D converter, and inputted to an operational circuit. The operational circuit integrates the A/D-converted output, and inputs it to a determination circuit. The determination circuit then compares the integrated output received from the operational circuit with a threshold level, and when the integrated output exceeds the threshold level, outputs a signal at a high level to the AND circuit. At this time, when a collision detection signal is inputted to the AND circuit from the microcontroller, the AND circuit opens its gate and transmits a signal to the base of a transistor, so that the transistor is turned on, a current is supplied to a squib from a power source, and the air bag is activated.

Further, Japanese Patent Laying-Open No. 2007-245829 discloses an air bag control device that detects a rollover, which represents a turnover of a vehicle. The air bag control device in this document captures an output value of an angular-velocity sensor, integrates the output value for prescribed time, and compares the generated integration value with a set determination threshold value, so as to determine whether or not an offset correction is correctly performed. Based on the premise that the offset correction is correctly performed, the air bag control device determines whether or not a rollover occurs. If the air bag control device detects a rollover, it supplies a current to a squib, which is identified as a heating resistor body for inflating the air bag, to activate the air bag.

Generally, in the acceleration or angular-velocity sensor, a self-diagnosis (primary check) for determining the presence or absence of a failure of the sensor is performed at power-up or the like. Specifically, a pseudo signal that corresponds to an acceleration or angular-velocity signal is applied to a sensor element, and based on a signal level of a sensor output, which signal level changes at that time, a primary check is conducted at power-up or the like.

Japanese Patent Laying-Open No. 2001-304871 discloses an abnormality diagnostic device for an angular-velocity sensor, capable of performing a correct self-diagnosis even if unexpected angular velocity is inputted thereto at the time of the self-diagnosis. In the abnormality diagnostic device, a signal level of an angular-velocity output, which is obtained in the state that a rotation pseudo signal is not applied to the sensor element, is held by a hold circuit in a primary check circuit. Based on the held signal level, a threshold value is variably set. A window comparator compares the set threshold value with a signal level of an angular-velocity output obtained in the state that a rotation pseudo signal is applied to the sensor element, and based on the results, performs a diagnosis as to the presence or absence of abnormalities.

Further, Japanese Patent Laying-Open No. 2003-262648 discloses a technique for suppressing an adverse effect on an offset correction operation, which adverse effect is caused by a self-diagnostic output.

According to this document, when a self-diagnostic circuit inputs a rectangular-wave self-diagnostic output to an acceleration sensor so as to perform a self-diagnostic check on an acceleration sensor, the acceleration sensor outputs a differential waveform. Thereby, variations appear in an output of a low-pass filter processing circuit for offset correction. Similar variations also appear in a corrected output obtained through an offset correction operation at an operational unit in a CPU (Central Processing Unit), so that the corrected output requires longer time for converging to a zero point, and zero point accuracy is lowered. In order to avoid this phenomenon, the offset correction operation is performed in the CPU prior to the self-diagnostic check (i.e. before the rectangular-wave self-diagnostic output is inputted to the acceleration sensor), or preferably concurrently with power-up.

The self-diagnosis as to whether or not the acceleration or angular velocity sensor normally operates is performed while the acceleration or angular velocity sensor is being operated. Therefore, if the determination as to whether or not the sensor is in a normal status is made in the state that the sensor main body receives a test signal for providing pseudo acceleration or angular velocity, and additionally receives unexpected acceleration or angular velocity externally exerted thereon, an incorrect diagnostic result is inevitably outputted.

Japanese Patent Laying-Open No. 2001-304871 described above provides one method for addressing this problem. In the method in this document, however, a signal level of a sensor output obtained in the state that a pseudo signal is applied to the sensor element is corrected based on a signal level of the sensor output obtained in the state that the pseudo signal is not applied to the sensor element. Therefore, if an instantaneous impact is exerted on the sensor, the acceleration or angular velocity externally exerted on the sensor may differ between the case that the pseudo signal is applied and the case that the pseudo signal is not applied, and hence a diagnosis may not be performed correctly.

SUMMARY OF THE INVENTION

An object of the present invention is to provide a self-diagnostic device for an acceleration or angular-velocity sensor, capable of performing a correct self-diagnosis even if an impact is externally exerted on the acceleration or angular-velocity sensor during the self-diagnosis.

In brief, the present invention is a self-diagnostic device for an acceleration or angular-velocity sensor, performing a diagnosis as to whether or not a sensor main body for detecting acceleration or angular velocity is in a normal status, including: a diagnosis control unit; an integration unit; and a determination unit. The diagnosis control unit provides pseudo acceleration or angular velocity to the sensor main body by applying a test signal having prescribed magnitude to the sensor main body. The integration unit integrates a sensor signal outputted from the sensor main body in response to the test signal. The determination unit determines whether or not an integration value obtained at an elapse of integration time preset in accordance with an individual difference of the sensor main body from a time point when the integration unit starts integrating the sensor signal falls within a prescribed normal range.

According to the present invention, the self-diagnosis of the acceleration or angular-velocity sensor is performed with use of the integration value of the sensor signal outputted from the sensor main body in response to the test signal. Therefore, a main advantage of the present invention is to enable a correct self-diagnosis because, even if an impact is externally exerted on the acceleration or angular-velocity sensor during the self-diagnosis, an effect of the impact is suppressed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
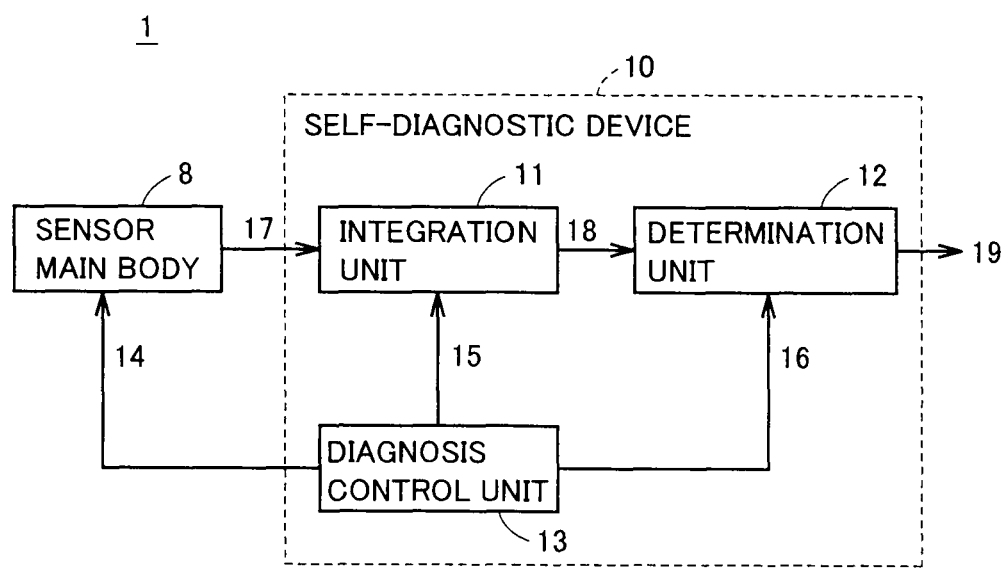
FIG. 1 is a block diagram that shows a configuration of an acceleration sensor 1 according to a first embodiment of the present invention.

Embodiments of the present invention will hereinafter be described in detail with reference to the drawings. The same or corresponding portions are provided with the same reference characters, and the description thereof will not be repeated. Each of the following embodiments will be described by taking an acceleration sensor as an example. However, the present invention can similarly be applied to an angular-velocity sensor.

First Embodiment

Configuration of a Self-Diagnostic Device for an Acceleration Sensor

FIG. 1 is a block diagram that shows a configuration of an acceleration sensor 1 according to a first embodiment of the present invention. Acceleration sensor 1 in FIG. 1 incorporates a self-diagnostic function. Acceleration sensor 1 includes a sensor main body 8 that detects acceleration, and a self-diagnostic device 10 that performs a diagnosis as to whether or not sensor main body 8 is in a normal status at power-up or the like.

Sensor main body 8 is a sensor that uses a weight supported by a spring, and detects acceleration based on a displacement amount of the weight. A sensor element, which is a main unit of sensor main body 8, is made of a movable unit including the weight, and a fixed unit supporting the movable unit via a spring. A sensor element having such a structure is generally fabricated by an MEMS (Micro-Electro-Mechanical Systems) technique that uses semiconductor microfabrication. In this case, a beam that supports the weight is used as a spring.

Examples of the method of detecting a displacement amount of the weight responsive to changes in acceleration include a method of using a strain gauge, a piezoelectric element, or the like attached to a spring, a method of detecting changes in capacitance between counter electrodes provided at the movable unit and the fixed unit, respectively, in the sensor element, and other methods. Sensor main body 8 in FIG. 1 is provided with a detection circuit that uses the above-described strain gauge or the like for detecting displacement of the weight, together with the sensor element. The detection circuit outputs a sensor signal 17 responsive to a displacement amount of the weight.

Sensor elements generally have variations in spring constant or mass of the weight because of manufacturing errors caused by semiconductor microfabrication, and hence have individual differences in characteristic. Therefore, a circuit for making sensitivity adjustment and zero point (offset) adjustment for sensor signal 17 is incorporated in the detection circuit provided at sensor main body 8.

In the case of an angular-velocity sensor, a weight supported by a spring is used to detect angular velocity, similarly as in the case of the acceleration sensor. However, the angular-velocity sensor periodically vibrates the weight with use of electrostatic force or the like, and thereby utilizes Coriolis force that acts on a direction orthogonal to both of the direction of the axis of rotation about which the weight rotates, and the direction along which the weight is vibrated. The angular-velocity sensor measures a displacement amount of the weight in the direction of the Coriolis force, to thereby detect angular velocity.

Self-diagnostic device 10 performs a diagnosis as to whether or not sensor main body 8 is in a normal status at power-up or the like, so as to ensure reliability of sensor main body 8. Specifically, counter electrodes for a self-diagnosis, which serves for displacing the weight by electrostatic force, are provided between the fixed unit and the movable unit in the sensor element. By applying a voltage (i.e. a pseudo acceleration signal 14) to the counter electrodes for a self-diagnosis to thereby displace the weight, pseudo acceleration is exerted on sensor main body 8. At this time, sensor main body 8 outputs sensor signal 17 responsive to the displacement of the weight, and hence based on this sensor signal 17, self-diagnostic device 10 detects whether or not sensor main body 8 is in a normal status.

Counter electrodes for a self-diagnosis also have manufacturing errors, and hence even if pseudo acceleration signal 14 (which is also referred to as a test signal) having the fixed magnitude is applied to sensor main body 8, the displacement amount of the weight caused by pseudo acceleration signal 14 varies, and consequently, the magnitude of sensor signal 17 outputted from sensor main body 8 also varies. As to a method of correcting variations in sensor signal 17, which are caused in accordance with an individual difference of sensor main body 8 when such pseudo acceleration signal 14 is applied, description will later be made with reference to FIGS. 10-12.

In the case of the angular-velocity sensor, it is also possible to provide pseudo angular velocity to the sensor main body by displacing the weight with use of electrostatic force or the like in the direction of the Coriolis force.

Description will hereinafter be made on a specific configuration of self-diagnostic device 10. Self-diagnostic device 10 shown in FIG. 1 includes an integration unit 11, a determination unit 12, and a diagnosis control unit 13.

Integration unit 11 integrates sensor signal 17 outputted from sensor main body 8 in response to pseudo acceleration signal 14. As described below with reference to FIGS. 4-9, it is possible to suppress an effect of an impact received by sensor main body 8 during the diagnosis, by integrating sensor signal 17.

Determination unit 12 determines whether or not sensor main body 8 is in a normal status, based on an integration value of the sensor signal, which is produced by integration unit 11 during prescribed integration time. As described below with reference to FIGS. 10-12, the integration time described above is set in accordance with an individual difference of sensor main body 8, at initial setting of acceleration sensor 1. It is noted that acceleration sensor 1 is initially set when, for example, acceleration sensor 1 is adjusted at a plant prior to shipment as a product.

Diagnosis control unit 13 is basically configured with a microcontroller and the like, and controls the entire operations of self-diagnostic device 10. Specifically, at the start of the self-diagnosis, diagnosis control unit 13 outputs pseudo acceleration signal 14 to sensor main body 8. At an elapse of prescribed output stabilization time (time required for stabilizing an output) from the start of outputting of pseudo acceleration signal 14, diagnosis control unit 13 outputs an integration start instruction 15 to integration unit 11. In response to integration start instruction 15, integration unit 11 starts integrating sensor signal 17.

Further, at a determination time point, namely, at an elapse of prescribed integration time from the outputting of integration start instruction 15, diagnosis control unit 13 outputs a determination instruction 16 to determination unit 12. Determination unit 12 determines whether or not the integration value obtained by integration unit 11 when determination unit 12 itself receives determination instruction 16 falls within a prescribed normal range, and outputs a determination result 19. After outputting an integration value for a self-diagnosis to determination unit 12, integration unit 11 terminates integration of sensor signal 17.

Figure 2:
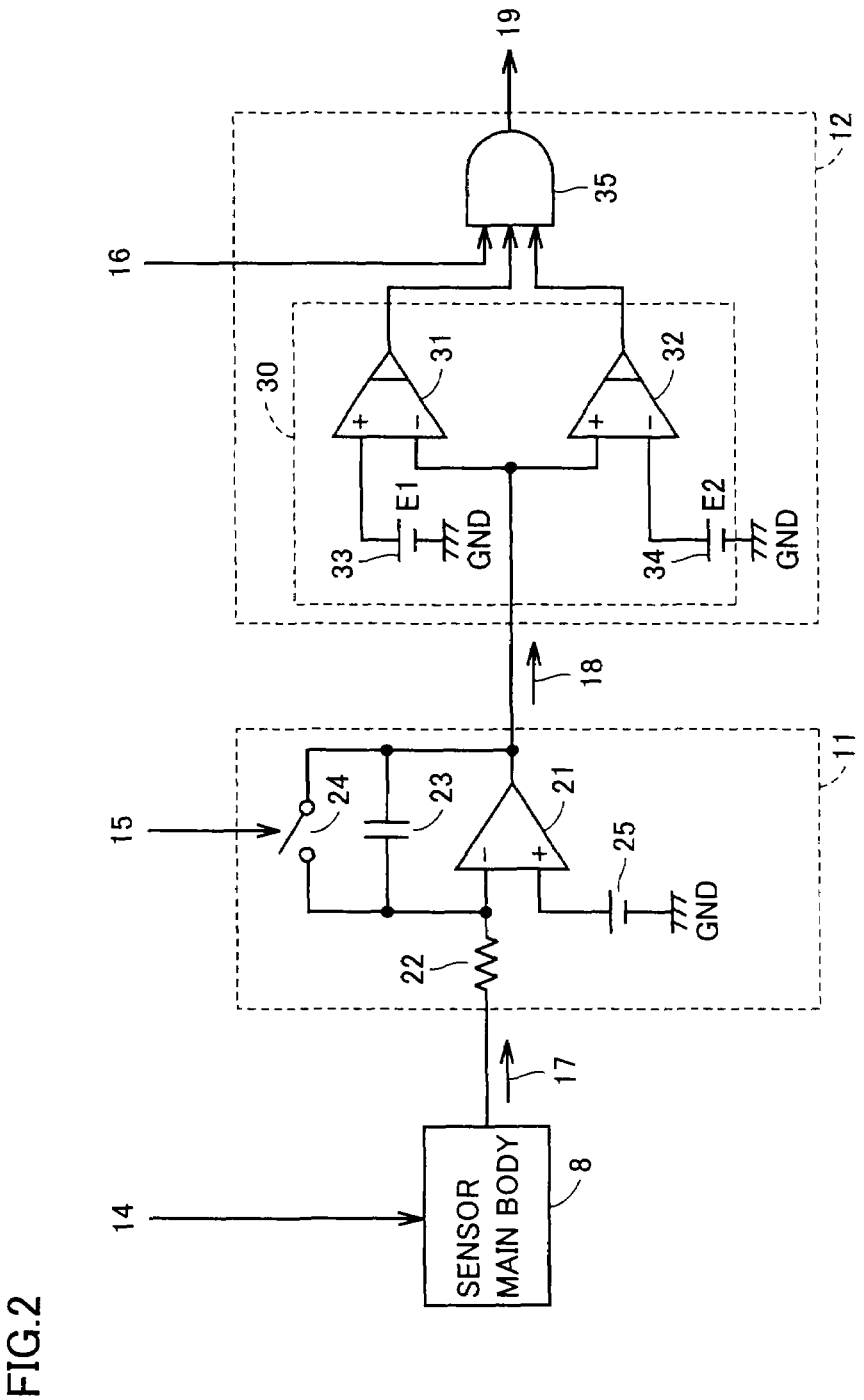
FIG. 2 is a circuit diagram that shows an example of a configuration of each of an integration unit 11 and a determination unit 12 in FIG. 1.

FIG. 2 is a circuit diagram that shows an example of a configuration of each of integration unit 11 and determination unit 12 in FIG. 1.

With reference to FIG. 2, integration unit 11 includes an operational amplifier 21, a capacitor 23 connected between an output terminal and an inverting input terminal of operational amplifier 21, a switch 24 connected in parallel with capacitor 23, a direct-current power source 25 connected between a non-inverting input terminal of operational amplifier 21 and a ground node GND, and a resistor element 22 connected between the inverting input terminal of operational amplifier 21 and an output node of sensor main body 8.

When receiving integration start instruction 15 from diagnosis control unit 13 in FIG. 1, switch 24 switches itself from an off state to an on state. A signal 18 of an integration value of sensor signal 17 is thereby outputted from an output terminal of operational amplifier 21, by being shifted by an amount of a voltage of direct-current power source 25.

Determination unit 12 includes a window comparator 30 and an AND circuit 35. Window comparator 30 includes comparators 31, 32 and direct-current power sources 33, 34. An inverting input terminal of comparator 31 and a non-inverting input terminal of comparator 32 are connected to the output terminal of operational amplifier 21. Further, direct-current power source 33 is connected between a non-inverting input terminal of comparator 31 and ground node GND, and direct-current power source 34 is connected between an inverting input terminal of comparator 32 and ground node GND.

AND circuit 35 receives determination instruction 16 and outputs of comparators 31, 32. AND circuit 35 outputs a signal at an H level as a determination result 19 in the case that a voltage of output signal 18 of operational amplifier 21 is larger than a voltage E2 of direct-current power source 34 and smaller than a voltage E1 of direct-current power source 33, and that AND circuit 35 itself receives determination instruction 16. Each of voltages E1, E2 is preset so as to correspond to the normal range of the integration value described above.

Figure 3:
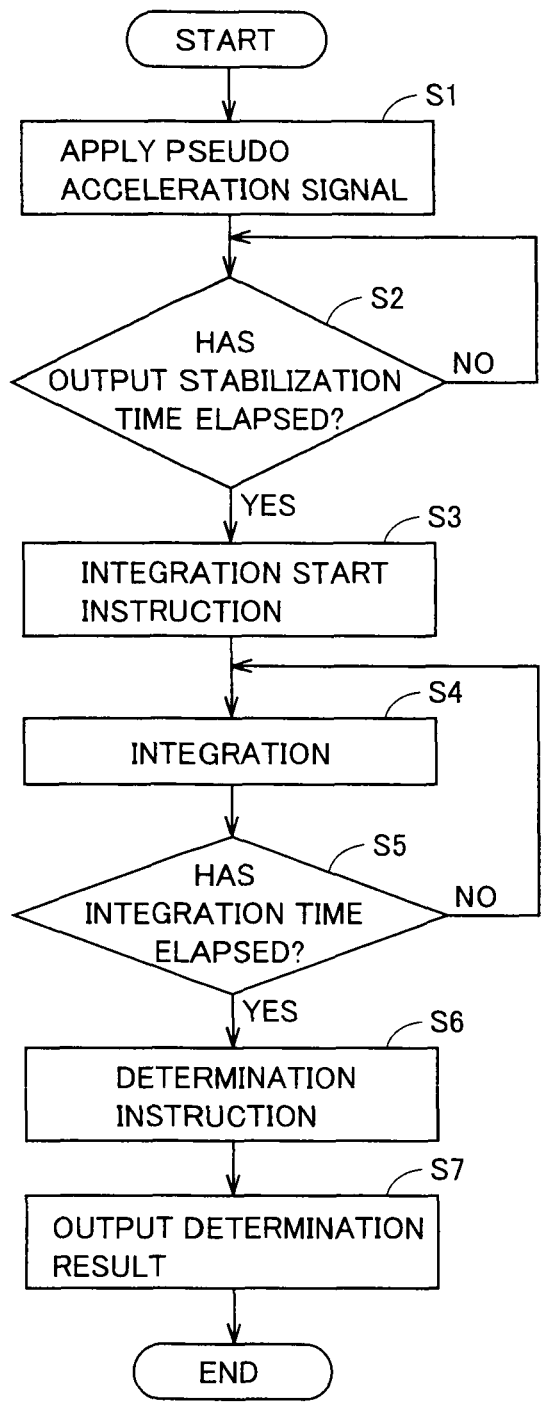
FIG. 3 is a flowchart that shows a procedure for diagnosing a sensor main body 8 by a self-diagnostic device 10 in FIG. 1.

FIG. 3 is a flowchart that shows a procedure for diagnosing sensor main body 8 by self-diagnostic device 10 in FIG. 1. The diagnostic procedure in FIG. 3 is executed, for example, at power-up of acceleration sensor 1.

With reference to FIGS. 1 and 3, in step S1, diagnosis control unit 13 starts applying pseudo acceleration signal 14 to sensor main body 8. The application of pseudo acceleration signal 14 continues until integration performed by integration unit 11 for prescribed integration time is completed.

In the next step S2, diagnosis control unit 13 determines whether or not prescribed output stabilization time has elapsed. When the prescribed output stabilization time has elapsed (YES in step S2), diagnosis control unit 13 moves the processing to step S3.

In step S3, diagnosis control unit 13 outputs integration start instruction 15 to integration unit 11. When receiving integration start instruction 15, integration unit 11 starts integrating sensor signal 17 outputted from sensor main body 8 (step S4).

In the next step S5, diagnosis control unit 13 determines whether or not prescribed integration time has elapsed. In the case that the prescribed integration time has not yet elapsed (NO in step S5), the integration in step S4 is continued. When the prescribed integration time has elapsed (YES in step S5), diagnosis control unit 13 moves the processing to step S6.

In step S6, diagnosis control unit 13 outputs determination instruction 16 to determination unit 12. Determination unit 12 determines whether or not an integration value 18 obtained by integration unit 11 when determination unit 12 itself receives determination instruction 16 falls within a prescribed appropriate range, and outputs determination result 19 (step S7). As such, the procedure for diagnosing sensor main body 8 by self-diagnostic device 10 is completed.

Effects of the Self-Diagnostic Device in the First Embodiment

Next, description will be made on the effects of self-diagnostic device 10 configured as described above, in comparison with the effects of an acceleration sensor 101 shown in FIG. 4 and serving as a comparative example.

Figure 4:
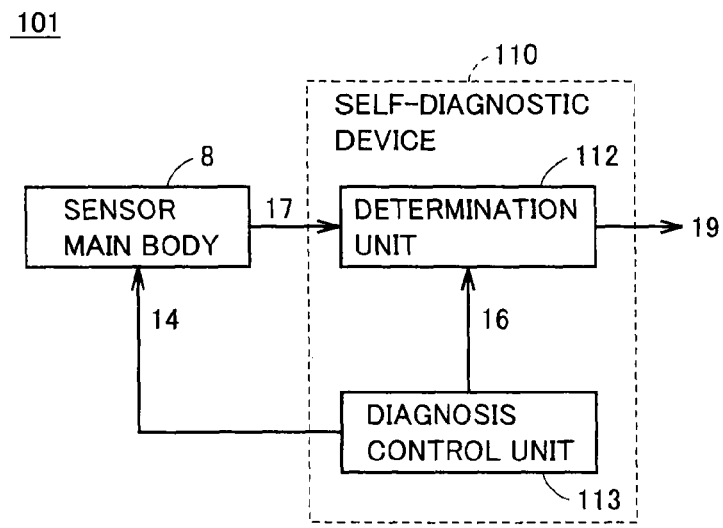
FIG. 4 is a block diagram that shows a configuration of an acceleration sensor 101 serving as a comparative example of acceleration sensor 1 in FIG. 1.

FIG. 4 is a block diagram that shows a configuration of acceleration sensor 101 serving as a comparative example of acceleration sensor 1 in FIG. 1. A self-diagnostic device 110 in FIG. 4 differs from self-diagnostic device 10 in FIG. 1 in that it does not include integration unit 11. In the case of FIG. 4, at an elapse of prescribed output stabilization time from the outputting of pseudo acceleration signal 14 to sensor main body 8, a diagnosis control unit 113 outputs determination instruction 16 to a determination unit 112. Determination unit 112 determines whether or not sensor main body 8 is in a normal status, based on sensor signal 17 outputted from sensor main body 8 in response to pseudo acceleration signal 14.

Figure 5:
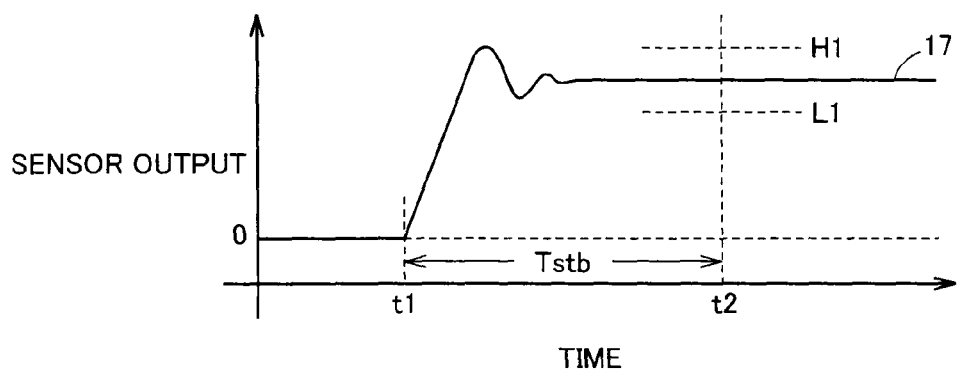
FIG. 5 is a timing diagram that shows an output of sensor main body 8 being diagnosed by a self-diagnostic device 110 in FIG. 4 (when sensor main body 8 in a normal status is determined as normal).
Figure 6:
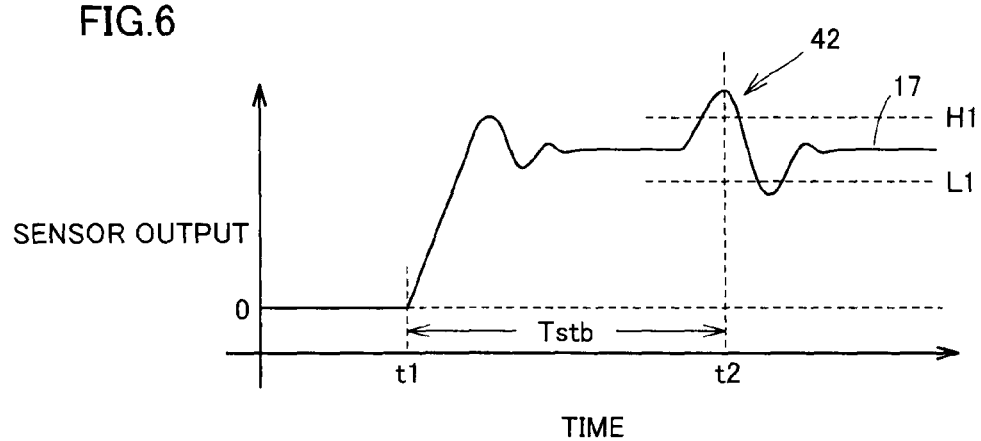
FIG. 6 is a timing diagram that shows an output of sensor main body 8 being diagnosed by self-diagnostic device 110 in FIG. 4 (when sensor main body 8 in a normal status is incorrectly determined as abnormal).
Figure 7:
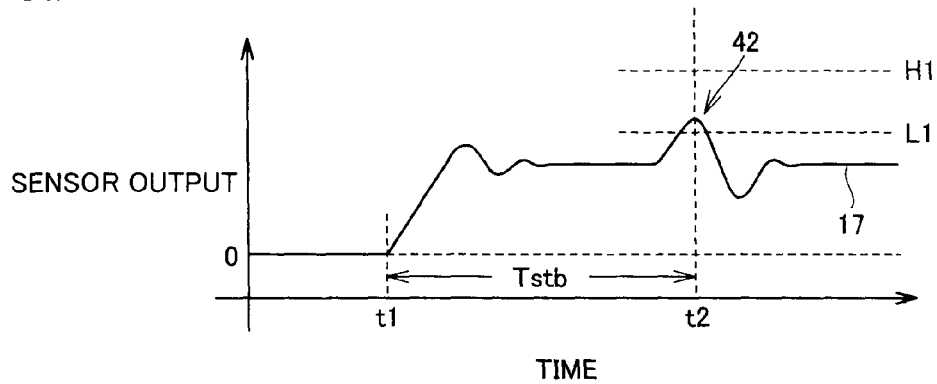
FIG. 7 is a timing diagram that shows an output of sensor main body 8 being diagnosed by self-diagnostic device 110 in FIG. 4 (when sensor main body 8 in an abnormal status is incorrectly determined as normal).

Each of FIGS. 5-7 is a timing diagram that shows an output of sensor main body 8 being diagnosed by self-diagnostic device 110 in FIG. 4. FIG. 5 shows the case that self-diagnostic device 110 diagnoses sensor main body 8 in a normal status and determines that it is in a normal status. FIG. 6 shows the case that sensor main body 8 in a normal status is incorrectly determined as abnormal because an impact is exerted on sensor main body 8 at a determination time point t2. FIG. 7 shows the case that sensor main body 8 in an abnormal status is incorrectly determined as normal because an impact is exerted on sensor main body 8 at determination time point t2.

Initially, with reference to FIGS. 4 and 5, pseudo acceleration signal 14 is applied to sensor main body 8 at a time point t1, so that sensor main body 8 outputs sensor signal 17. At time point t2 at which prescribed output stabilization time Tstb has elapsed from time point t1, determination unit 112, which has received determination instruction 16, determines whether or not sensor signal 17 falls within a prescribed normal range (the upper limit: H1, the lower limit: L1). In the case of FIG. 5, sensor signal 17 falls between the upper limit H1 and the lower limit L1 at time point t2, and thus determination unit 112 determines that sensor main body 8 is in a normal status.

In the case of FIG. 6, in contrast, an impact is exerted on sensor main body 8 at determination time point t2, and thus a noise caused by a disturbance is superimposed on sensor signal 17 (see reference character 42 in FIG. 6). If this impact were not exerted, sensor main body 8 should be determined as normal because sensor signal 17 falls between upper limit H1 and lower limit L1. Because of the exerted impact, however, sensor signal 17 exceeds upper limit H1 at determination time point t2, and consequently, sensor main body 8 in a normal status is incorrectly determined as abnormal.

In the case of FIG. 7, in contrast, an impact is exerted on sensor main body 8 at determination time point t2, and thus a noise caused by a disturbance is superimposed on sensor signal 17, similarly as in the case of FIG. 6 (see reference character 42 in FIG. 7). If this impact were not exerted, sensor main body 8 should be determined as abnormal because sensor signal 17 is below lower limit L1. However, because of the exerted impact, sensor signal 17 falls between upper limit H1 and lower limit L1 at determination time point t2, and consequently, sensor main body 8 in an abnormal status is incorrectly determined as normal.

As such, self-diagnostic device 110 in the comparative example may make incorrect determination when an impact is exerted at a determination time point of sensor main body 8. In contrast, self-diagnostic device 10 in the first embodiment determines whether or not sensor main body 8 is in a normal status based on an integration value of sensor signal 17 outputted from sensor main body 8, so that it is possible to suppress an effect of the impact and perform a correct diagnosis.

Figure 8:
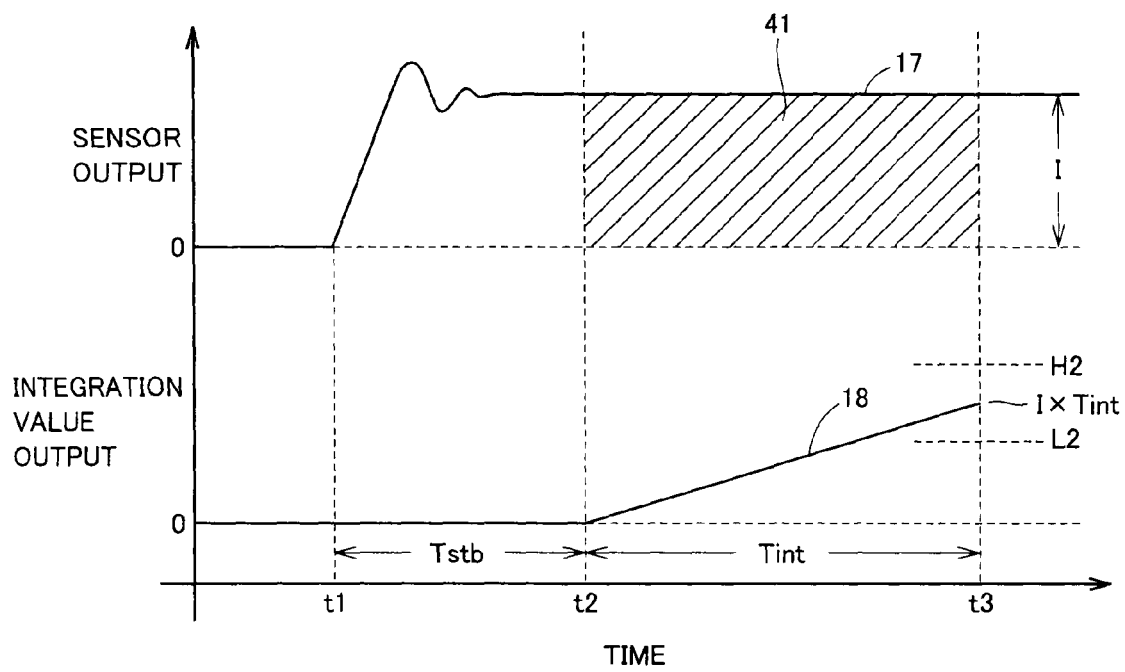
FIG. 8 is a timing diagram that shows an output of each of sensor main body 8 and integration unit 11 during a diagnosis by self-diagnostic device 10 in FIG. 1 (when sensor main body 8 receives no impact within integration time).
Figure 9:
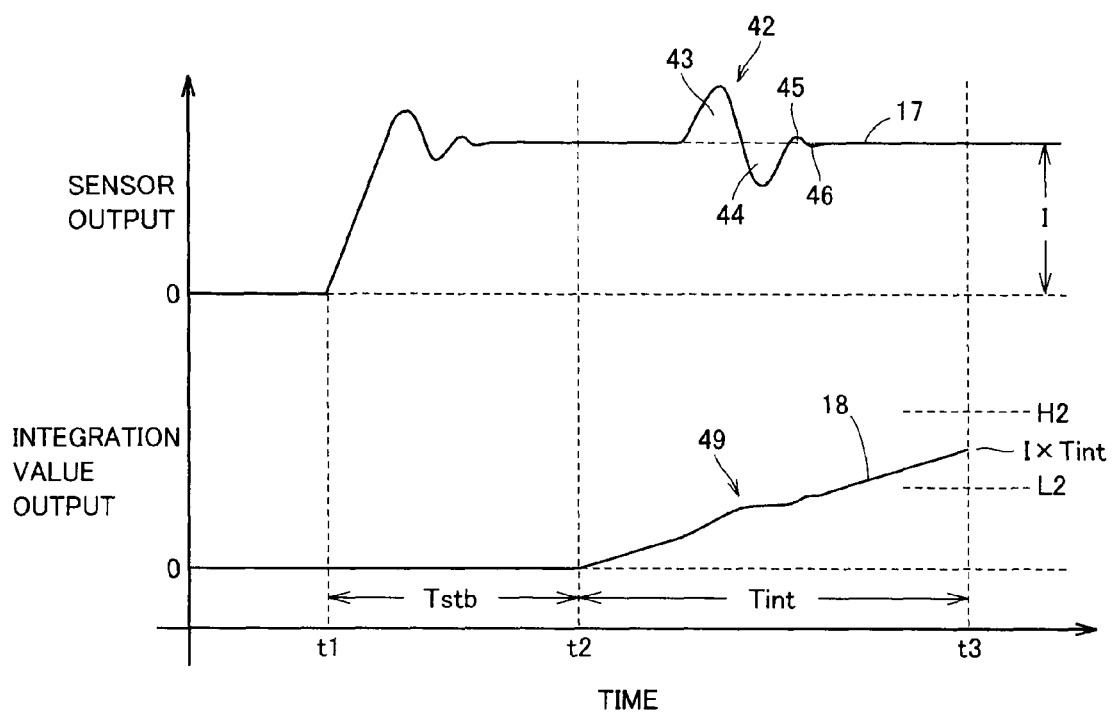
FIG. 9 is a timing diagram that shows an output of each of sensor main body 8 and integration unit 11 during a diagnosis by self-diagnostic device 10 in FIG. 1 (when sensor main body 8 receives an impact within integration time).

Each of FIGS. 8 and 9 is a timing diagram that shows an output of each of sensor main body 8 and integration unit 11 during a diagnosis by self-diagnostic device 10 in FIG. 1. FIG. 8 shows the case that sensor main body 8 does not receive an impact within integration time, while FIG. 9 shows the case that sensor main body 8 receives an impact within integration time. In each of FIGS. 8 and 9, the upper graph therein shows sensor signal 17 outputted from sensor main body 8, and the lower graph therein shows signal 18 of an integration value outputted from integration unit 11.

Initially, with reference to FIGS. 1 and 8, pseudo acceleration signal 14 is applied to sensor main body 8 at time point t1, so that sensor signal 17 is outputted from sensor main body 8. At time point t2, namely, at an elapse of prescribed output stabilization time Tstb from time point t1, integration unit 11, which has received integration start instruction 15, starts integrating sensor signal 17. Consequently, signal 18 of the integration value outputted from integration unit 11 is linearly increased as time elapses.

At a determination time point t3, namely, at an elapse of prescribed integration time Tint from time point t2, determination unit 12 determines whether or not the integration value at time point t3 falls within a prescribed normal range (the upper limit: H2, the lower limit: L2). The integration value at determination time point t3 is equal to an area of a hatched portion 41 in FIG. 8. In other words, given that the intensity of sensor signal 17 between time points t2 and t3 is set to be I, the integration value at determination time point t3 is approximately equal to I×Tint. In the case of FIG. 8, the integration value at determination time point t3 falls between upper limit H2 and lower limit L2, and hence determination unit 12 determines that sensor main body 8 is in a normal status.

In contrast, in the case of FIG. 9, sensor main body 8 receives an impact between time points t2 and t3, so that a noise caused by a disturbance is superimposed on sensor signal 17 (see reference character 42 in FIG. 9). Further, an effect of the noise also appears in signal 18 of the integration value produced by integration unit 11 (see reference character 49 in FIG. 9).

It is noted that the sensor element in acceleration sensor 1 has a structure in which the weight is supported by the spring. In the state that pseudo acceleration signal 14 is steadily applied, the balance is achieved between electrostatic force caused by pseudo acceleration signal 14 and restoring force caused by the spring. Accordingly, when an instantaneous impact is additionally exerted in this state, the weight in the sensor element repeatedly vibrates by allowing the position at which the balance is achieved between electrostatic force caused by pseudo acceleration signal 14 and restoring force caused by the spring to serve as the center of vibration.

Consequently, as shown in FIG. 9, sensor signal 17 obtained when an impact is exerted also vibrates by allowing mean intensity I to serve as the center of vibration (see reference character 42 in FIG. 9). At this time, an area of a portion 43 located above mean intensity I of sensor signal 17 and an area of a portion 44 located below mean intensity I of sensor signal 17 become approximately equal and cancel each other, and an area of a portion 45 located above mean intensity I and an area of a portion 46 located below mean intensity I become approximately equal and cancel each other. Accordingly, although signal 18 of the integration value produced by integration unit 11 does not linearly increase at a time point at which an impact is received, the integration value at determination time point t3 becomes approximately equal to a value (I×Tint) obtained when an impact is not received. In other words, an effect of the impact is relieved in signal 18 of the integration value.

As such, self-diagnostic device 10 for acceleration sensor 1 in the first embodiment performs a self-diagnosis of the acceleration sensor, based on an integration value of sensor signal 17 outputted from sensor main body 8 in response to pseudo acceleration signal 14. Therefore, even if an impact is externally exerted on sensor main body 8 during the self-diagnosis, an effect of the impact is suppressed, and hence a correct self-diagnosis can be performed.

In the above description, self-diagnostic device 10 is set to be in the state that pseudo acceleration is applied thereto by displacing the weight in the sensor element by electrostatic force. However, means for displacing the weight is not limited to electrostatic force. Other means such as magnetic force may also be used to displace the weight to achieve the state that pseudo acceleration is applied.

(Method of Setting Integration Time—Correction of Variations in Sensor Signal)

Next, description will be made on a method of setting integration time Tint.

As described in FIG. 1, even if pseudo acceleration signal 14 having the fixed magnitude is applied, the magnitude of sensor signal 17 outputted from sensor main body 8 varies because of an individual difference of sensor main body 8. Therefore, in accordance with the individual difference of sensor main body 8, it is necessary to adjust any of the intensity of pseudo acceleration signal 14, integration time Tint, and the normal range (upper limit H2 and lower limit L2) of the integration value.

Here, to adjust the intensity of pseudo acceleration signal 14, a D/A (Digital to Analog) converter is required for making highly-accurate adjustment in accordance with an individual difference of sensor main body 8. Therefore, self-diagnostic device 10 is increased in circuit size, which is not preferable.

A set value of the normal range for the integration value is often determined by a request of the system having the acceleration sensor incorporated therein. For example, in the air bag control device for a motor vehicle, an air bag is operated based on an integration value of the acceleration corresponding to velocity at which a passenger is thrown forward at the time of collision. Therefore, in the self-diagnosis of the acceleration sensor, it is necessary to diagnose the sensor by setting the normal range at or above the integration value of acceleration at which the air bag is operated, so as to ensure reliability of the sensor. Accordingly, it is not preferable to change the set value of the normal range for the integration value at the time of a self-diagnosis, in accordance with an individual difference of sensor main body 8.

Figure 10:
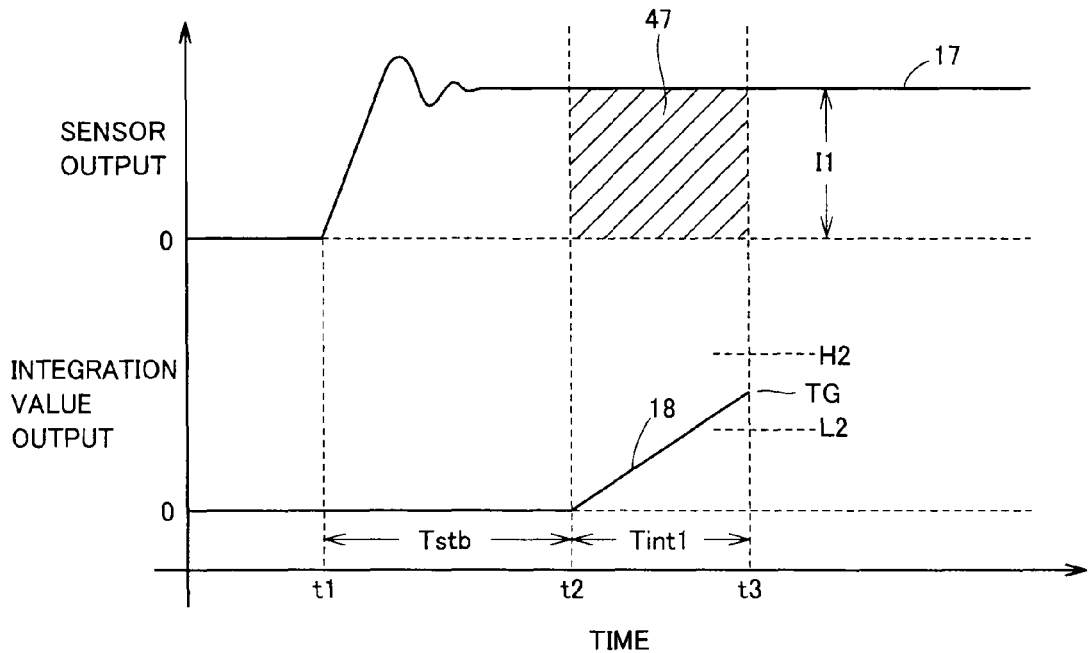
FIG. 10 is a diagram for describing a method of initially setting integration time (when an output of sensor main body 8 is large).
Figure 11:
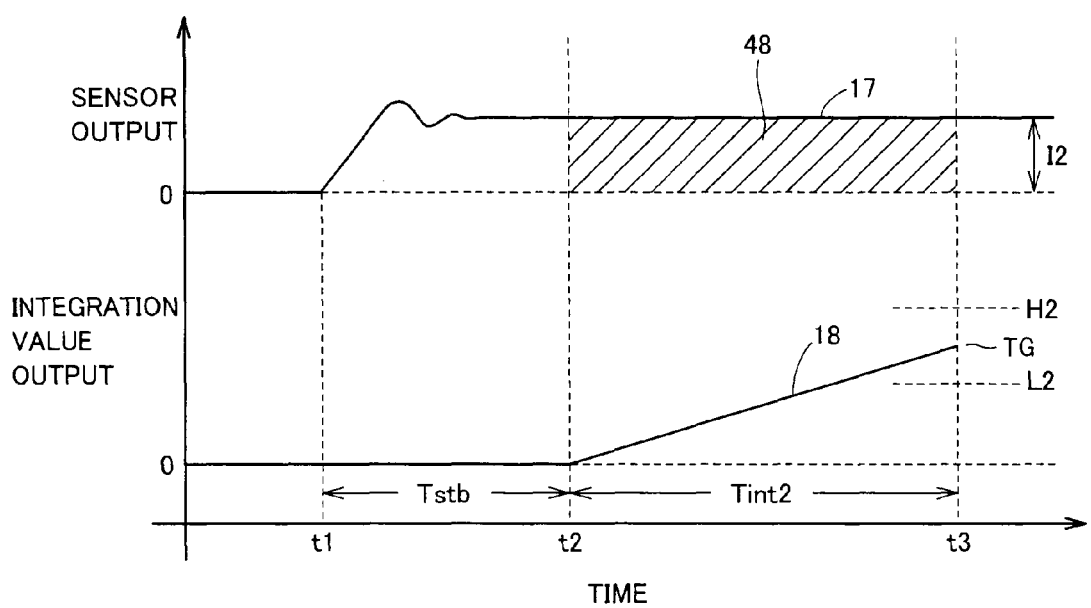
FIG. 11 is a diagram for describing a method of initially setting integration time (when an output of sensor main body 8 is small).

Therefore, in self-diagnostic device 10, each of pseudo acceleration signal 14 and the normal range for the integration value of sensor signal 17 at the time of determination is set to have fixed magnitude, regardless of an individual difference of sensor main body 8. Instead, integration time Tint is set in accordance with the magnitude of sensor signal 17 at initial setting of acceleration sensor 1, such that the integration value of sensor signal 17 outputted from sensor main body 8 in response to pseudo acceleration signal 14 coincides with a prescribed target value falling within the normal range. With reference to FIGS. 10 and 11, the method of setting integration time will further be described.

Each of FIGS. 10 and 11 is a diagram for describing a method of initially setting the integration time. FIG. 11 shows the case that the intensity of sensor signal 17 outputted from sensor main body 8 is smaller than the intensity in the case of FIG. 10. In each of FIGS. 10 and 11, the upper graph therein shows sensor signal 17 outputted from sensor main body 8, while the lower graph therein shows signal 18 of the integration value outputted from integration unit 11.

Initially, with reference to FIGS. 1 and 10, pseudo acceleration signal 14 is applied to sensor main body 8 at time point t1 during initial setting of acceleration sensor 1, so that sensor signal 17 is outputted from the sensor main body. The magnitude of pseudo acceleration signal 14 is the same as the magnitude used in the self-diagnosis generally performed, and is set in a fixed manner regardless of an individual difference of sensor main body 8.

At time point t2, namely, at an elapse of prescribed output stabilization time Tstb from time point t1, integration unit 11, which has received integration start instruction 15, starts integrating sensor signal 17. As a result, signal 18 of the integration value outputted from integration unit 11 is linearly increased as time elapses. It is noted that output stabilization time Tstb is the same as the output stabilization time used in a self-diagnosis generally performed.

At time point t3, signal 18 of the integration value reaches a target value TG. At this time, the integration value of sensor signal 17 is equal to an area of a hatched portion 47 in FIG. 10. Target value TG is set in a fixed manner regardless of an individual difference of sensor main body 8, and set to be equal to a median of the normal range (upper limit: H2, lower limit: L2). Time Tint1, which corresponds to a period between integration start time point t2 and time point t3, is set as the integration time to be used in a self-diagnosis. Integration time Tint1 is stored in a memory of the microcontroller that configures diagnosis control unit 13, and referred to at the time of a self-diagnosis.

In contrast, in the case of FIG. 11, intensity I2 of sensor signal 17 outputted in response to pseudo acceleration signal 14 is smaller than intensity I1 of sensor signal 17 in FIG. 10. Therefore, when the integration value of sensor signal 17 (the area of a hatched portion 48 in FIG. 11) is equal to target value TG at time point t3 in FIG. 11, time Tint 2 required for signal 18 of the integration value to reach target value TG becomes longer than time Tint1 in the case of FIG. 10. In the case of FIG. 11, time Tint2 is set as the integration time to be used in a self-diagnosis. As such, in accordance with variations in intensity of sensor signal 17, integration time for sensor signal 17 in a self-diagnosis is determined.

Figure 12:
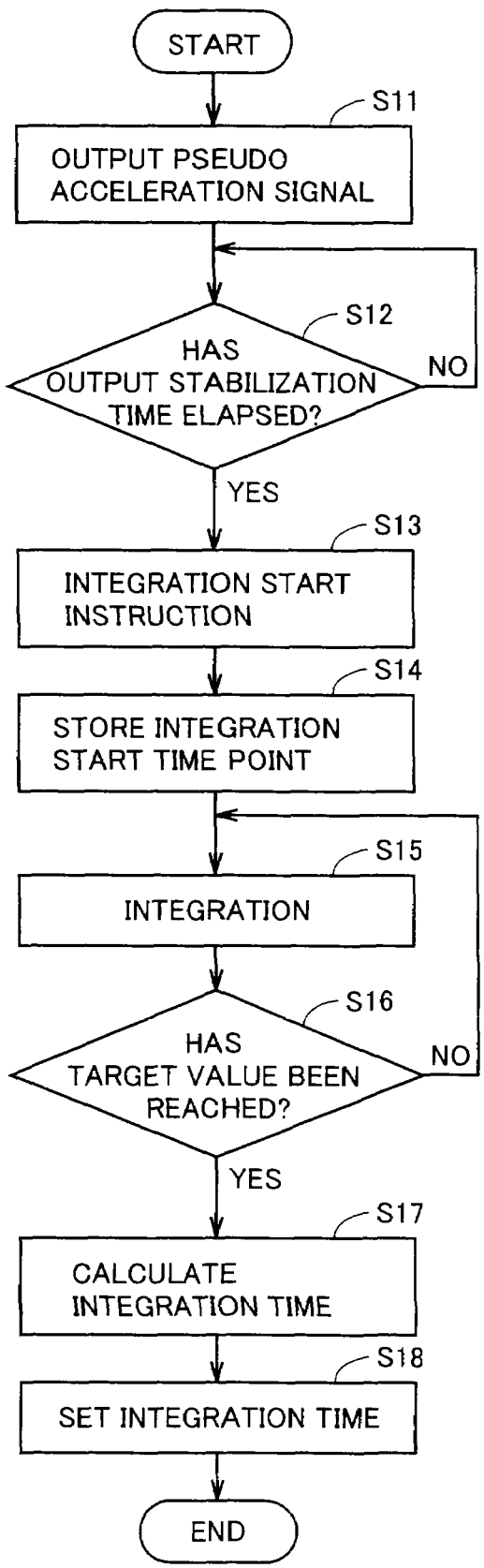
FIG. 12 is a flowchart that shows a procedure for initially setting integration time.

FIG. 12 is a flowchart that shows a procedure for initially setting the integration time. With reference to FIGS. 1 and 12, the description so far is outlined, and the procedure for initially setting the integration time will be described.

In step S11, diagnosis control unit 13 applies pseudo acceleration signal 14 to sensor main body 8. The application of pseudo acceleration signal 14 is continued until signal 18 of the integration value reaches a prescribed target value.

In the next step S12, diagnosis control unit 13 determines whether or not prescribed output stabilization time has elapsed. In the case that the prescribed output stabilization time has elapsed (YES in step S12), diagnosis control unit 13 moves the processing to step S13.

In step S13, diagnosis control unit 13 outputs integration start instruction 15 to integration unit 11. Diagnosis control unit 13 stores a time point at which integration start instruction 15 is outputted (integration start time point) (step S14). When receiving integration start instruction 15, integration unit 11 starts integrating sensor signal 17 outputted from sensor main body 8 (step S15).

In the next step S16, determination unit 12 determines whether or not integration value 18 produced by integration unit 11 has reached a prescribed target value. In the case that the prescribed target value has not yet been reached (NO in step S16), the integration in step S15 is continued. When the prescribed target value has been reached (YES in step S16), the procedure moves to step S17.

In step S17, diagnosis control unit 13 calculates the integration time by determining a difference between the integration start time point and the time point at which the target value has been reached.

In the next step S18, diagnosis control unit 13 stores the integration time calculated in step S17 in a memory. The integration time is referred to at the time of a self-diagnosis of acceleration sensor 1.

As such, in self-diagnostic device 10 in the first embodiment, integration time Tint is adjusted to satisfy the conditions for the preset magnitude of pseudo acceleration signal 14 and the preset target value of the integration value. In the above description, the magnitude of pseudo acceleration signal 14 and the target value of the integration value are fixed. However, each of them is not necessarily fixed. The important thing is to adjust integration time Tint in accordance with an individual difference of sensor main body 8, and thus the magnitude of pseudo acceleration signal 14 and the target value of the integration value may arbitrarily be changed within the range that satisfies a request of the system having the acceleration sensor incorporated therein.

Second Embodiment

Figure 13:
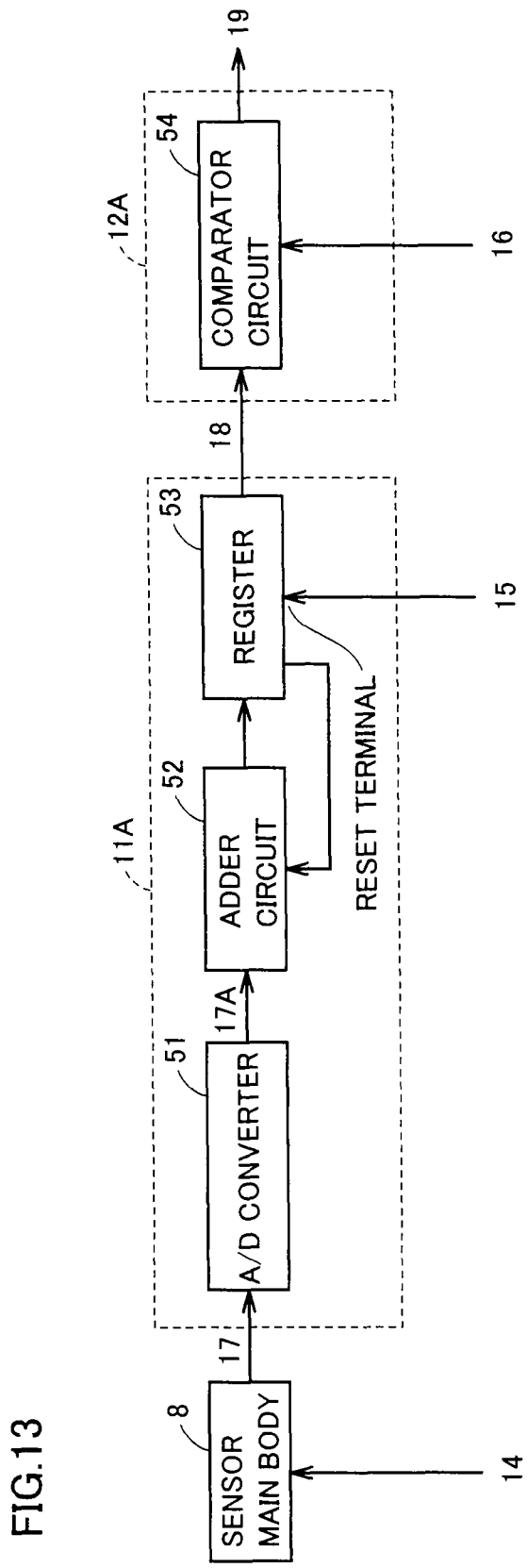
FIG. 13 is a block diagram that shows a configuration of each of an integration unit 11A and a determination unit 12A according to a second embodiment of the present invention.

FIG. 13 is a block diagram that shows a configuration of each of an integration unit 11A and a determination unit 12A according to a second embodiment of the present invention. Integration unit 11A and determination unit 12A in FIG. 13 are equivalent to the integration unit 11 and determination unit 12 in FIG. 1 configured with digital circuits.

With reference to FIG. 12, integration unit 11A includes an A/D (Analog to Digital) converter 51, an adder circuit 52, and a register 53. Further, determination unit 12A includes a comparator circuit 54.

A/D converter 51 digitally converts sensor signal 17 outputted from sensor main body 8 in response to pseudo acceleration signal 14. A sensor signal 17A, which has been digitally converted, is outputted to adder circuit 52.

Adder circuit 52 repeatedly adds sensor signal 17A outputted from A/D converter 51 and the data stored in register 53. Whenever adder circuit 52 executes addition, register 53 stores a result of the addition as new data. Accordingly, register 53 stores the integration value of sensor signal 17A outputted from the A/D converter.

Here, the data stored in register 53 is reset when integration start instruction 15 is received. Therefore, the data stored in register 53 is equal to the integration value of sensor signal 17A obtained after diagnosis control unit 13 outputs integration start instruction 15.

When receiving determination instruction 16, comparator circuit 54 compares the data stored in register 53 with the upper limit and the lower limit of a prescribed normal range, to thereby determine whether or not sensor main body 8 is in a normal status. As such, with the self-diagnostic device in the second embodiment as well, it is also possible to diagnose sensor main body 8 similarly as in the case of the first embodiment.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A self-diagnostic device for an acceleration or angular-velocity sensor, performing a diagnosis as to whether or not a sensor main body for detecting acceleration or angular velocity is in a normal status, comprising:
a diagnosis control unit, including a processor, for providing pseudo acceleration or angular velocity to said sensor main body by applying a test signal having prescribed magnitude to said sensor main body;
an integration unit for integrating a sensor signal outputted from said sensor main body in response to said test signal, the integration unit beginning integration after a non-zero output stabilization time after application of the test signal; and
a determination unit for determining whether or not an integration value obtained at an elapse of an integration time falls within a prescribed normal range, the integration time being set equal to a value at which the integration value is equal to a prescribed target value during an initial integration, the target value being within the normal range.

2. The self-diagnostic device for the acceleration or angular-velocity sensor according to claim 1, wherein the magnitude of the sensor signal in response to said test signal varies in accordance with an individual difference of said sensor main body, and each of said test signal and said normal range has fixed magnitude, regardless of the individual difference of said sensor main body.

3. The self-diagnostic device for the acceleration or angular-velocity sensor according to claim 1, wherein said diagnosis control unit outputs an integration start instruction to said integration unit at an elapse of the output stabilization time from a start of the application of said test signal to said sensor main body, and further outputs a determination instruction to said determination unit at an elapse of said integration time from the outputting of said integration start instruction, said integration unit includes an operational amplifier having a non-inverting input terminal fixed to a constant voltage, a capacitive element connected between an inverting input terminal and an output terminal of said operational amplifier, a resistor element having one end connected to the inverting input terminal of said operational amplifier, and having the other end receiving the sensor signal outputted from said sensor main body, and a switch connected between the inverting input terminal and the output terminal of said operational amplifier, and brought into an on state when receiving said integration start instruction, and said determination unit includes a window comparator connected to the output terminal of said operational amplifier, for determining whether or not an output of said operational amplifier falls within a normal voltage range corresponding to said normal range, and a logic gate for outputting a determination result of said window comparator when receiving said determination instruction.

4. The self-diagnostic device for the acceleration or angular-velocity sensor according to claim 1, wherein said diagnosis control unit outputs an integration start instruction to said integration unit at an elapse of the output stabilization time from a start of the application of said test signal to said sensor main body, and further outputs a determination instruction to said determination unit at an elapse of said integration time from the outputting of said integration start instruction, said integration unit includes an adder circuit and a register, said adder circuit repeatedly adds said sensor signal digitally converted and data stored in said register, whenever said adder circuit executes addition, said register stores a result of the addition as new data, and when said integration start instruction is received, said register resets the stored data, and said determination unit includes a comparator circuit for comparing the data stored in said register with an upper limit and a lower limit of said normal range, when said determination instruction is received.

5. A method of performing a self-diagnosis of an acceleration or angular-velocity sensor to perform a diagnosis as to whether or not a sensor main body for detecting acceleration or angular velocity is working properly, comprising:
the step of providing pseudo acceleration or angular velocity to said sensor main body by applying a test signal having prescribed magnitude to said sensor main body;
the step of integrating a sensor signal outputted from said sensor main body in response to said test signal, the step of integrating beginning after a non-zero output stabilization time after application of the test signal and being performed by an integrating circuit; and
the step of determining whether or not an integration value obtained at an elapse of an integration time falls within a prescribed normal range, the integration time being set equal to a value at which the integration value is equal to a prescribed target value during an initial integration, the target value being within the normal range; and
the step of outputting a result of the step of determining to indicate whether or not the acceleration or angular-velocity sensor is working properly.

6. An acceleration or angular-velocity sensor, comprising:
a sensor main body for detecting acceleration or angular velocity; and
a self-diagnostic device for performing a diagnosis as to whether or not said sensor main body is in a normal status, said self-diagnostic device including
a diagnosis control unit for providing pseudo acceleration or angular velocity to said sensor main body by applying a prescribed test signal to said sensor main body,
an integration unit for integrating a sensor signal outputted from said sensor main body in response to said test signal, the integration unit beginning integration after a non-zero output stabilization time after application of the test signal, and
a determination unit for determining whether or not an integration value obtained at an elapse of an integration time falls within a prescribed normal range, the integration time being set equal to a value at which the integration value is equal to a prescribed target value during an initial integration, the target value being within the normal range.

7. A method of initially setting an acceleration or angular-velocity sensor, the acceleration or angular-velocity sensor having a self-diagnostic device for diagnosing a sensor main body for detecting acceleration or angular velocity, said self-diagnostic device including a diagnosis control unit for providing pseudo acceleration or angular velocity to said sensor main body by applying a test signal having prescribed magnitude to said sensor main body, an integration unit for integrating a sensor signal outputted from said sensor main body in response to said test signal, and a determination unit for determining whether or not an integration value obtained at an elapse of integration time set at initial setting from a time point when said integration unit starts integrating the sensor signal falls within a prescribed normal range, the method comprising:
the step of applying a test signal having said prescribed magnitude to said sensor main body by said diagnosis control unit;
the step of integrating the sensor signal outputted from said sensor main body in response to the test signal having said prescribed magnitude, the step of integrating beginning after a non-zero output stabilization time after application of the test signal;
the step of determining whether or not the integration value obtained by said step of integrating has reached a prescribed target value set to fall within said normal range; and
the step of setting time required from a start of said step of integrating to a time point at which the integration value obtained by said step of integrating reaches said target value, to serve as said integration time.

* * * * *